US012797900B2

(12) United States Patent
Han et al.

(10) Patent No.: US 12,797,900 B2
(45) Date of Patent: Nov. 17, 2026

(54) MOISTURE AND OXYGEN BARRIER LAMINATE WITH IMPROVED DURABILITY AND FLEXIBILITY

(71) Applicant: KOLON INDUSTRIES, INC., Seoul (KR)

(72) Inventors: Ah Reum Han, Seoul (KR); Chang Won Park, Seoul (KR)

(73) Assignee: KOLON INDUSTRIES, INC, Seoul (KR)

( * ) Notice: Subject to any disclaimer, the term of this patent is extended or adjusted under 35 U.S.C. 154(b) by 590 days.

(21) Appl. No.: 18/253,414

(22) PCT Filed: Dec. 9, 2021

(86) PCT No.: PCT/KR2021/018565
§ 371 (c)(1),
(2) Date: May 18, 2023

(87) PCT Pub. No.: WO2022/145786
PCT Pub. Date: Jul. 7, 2022

(65) Prior Publication Data

US 2024/0001402 A1 Jan. 4, 2024

(30) Foreign Application Priority Data

Dec. 28, 2020 (KR) ........................ 10-2020-0184952
Dec. 6, 2021 (KR) ........................ 10-2021-0172899

(51) Int. Cl.
*B05D 7/00* (2006.01)
*C09D 7/63* (2018.01)
*C09D 183/08* (2006.01)

(52) U.S. Cl.
CPC ................. *B05D 7/52* (2013.01); *C09D 7/63* (2018.01); *C09D 183/08* (2013.01); *B05D 2201/02* (2013.01); *B05D 2503/00* (2013.01); *B05D 2518/10* (2013.01)

(58) Field of Classification Search
None
See application file for complete search history.

(56) References Cited

U.S. PATENT DOCUMENTS

| | | | | | |
|---|---|---|---|---|---|
| 2002/0146568 | A1* | 10/2002 | Ho | ......................... | C08G 18/72 428/424.4 |
| 2006/0246241 | A1 | 11/2006 | Kruger | | |

FOREIGN PATENT DOCUMENTS

| | | | |
|---|---|---|---|
| JP | 2003205573 | A | 7/2003 |
| JP | 2004516958 | A | 6/2004 |
| JP | 2006522695 | A | 10/2006 |
| JP | 2011161892 | * | 8/2011 |
| JP | 2011161892 | A | 8/2011 |
| JP | 2012134445 | A | 7/2012 |
| JP | 2012527361 | A | 11/2012 |
| JP | 2013073115 | A | 4/2013 |
| JP | 2013151123 | A | 8/2013 |
| JP | 2018090654 | A | 6/2018 |
| KR | 20030067732 | A | 8/2003 |
| KR | 20120014161 | A | 2/2012 |
| KR | 20170073948 | A | 6/2017 |
| KR | 20180003143 | A | 1/2018 |
| WO | 02053379 | A1 | 7/2002 |
| WO | 2018042804 | A1 | 3/2018 |
| WO | 2019044525 | A1 | 3/2019 |

OTHER PUBLICATIONS

JP_2011161892_A_I Eng trans (Year: 2011).*
International Search Report Dated Jul. 7, 2022.

* cited by examiner

*Primary Examiner* — Jeffrey D Washville
(74) *Attorney, Agent, or Firm* — Harvest IP Law, LLP

(57) ABSTRACT

The present invention relates to a moisture and oxygen barrier laminate with improved durability and flexibility. According to the present invention, there is provided a laminate, comprising: an inorganic barrier layer and a protective layer sequentially formed on one surface of a transparent substrate, wherein the protective layer includes an organic copolymer containing a repeating unit derived from a siloxane compound. The laminate according to the present invention can maintain excellent interlayer adhesion even when deformation such as bending is applied, thereby exhibiting excellent moisture and oxygen barrier properties.

12 Claims, No Drawings

MOISTURE AND OXYGEN BARRIER LAMINATE WITH IMPROVED DURABILITY AND FLEXIBILITY

CROSS REFERENCE TO RELATED APPLICATION(S)

This application is a National Stage of International Application No. PCT/KR2021/018565 filed on Dec. 9, 2021, claiming priority based on Korean Patent Application No. 10-2020-0184952 filed on Dec. 28, 2020 and Korean Patent Application No. 10-2021-0172899 filed on Dec. 6, 2021, the disclosures of which are incorporated herein by references in their entireties.

TECHNICAL FIELD

The present invention relates to a moisture and oxygen barrier laminate with improved durability and flexibility.

BACKGROUND ART

A barrier laminate in which an inorganic thin film of aluminum oxide or the like is formed on the surface of a plastic substrate is applied for packaging purpose of various articles such as foods and electronic devices.

However, such a barrier laminate has a problem that when deformation such as bending is applied, the barrier properties are deteriorated due to separation or cracking between layers.

In this regard, various studies have been attempted to improve the durability and flexibility of the barrier laminate. For example, they include introducing a primer layer for improving adhesion between the plastic substrate and the inorganic thin film, or laminating a polymer coating layer of various compositions onto the inorganic thin film.

However, since durability and flexibility exhibited by the barrier laminate generally have a trade-off relation, there is a limitation that it is difficult to satisfy these properties at the same time.

DETAILED DESCRIPTION OF THE INVENTION

Technical Problem

It is an object of the present invention to provide a moisture and oxygen barrier laminate with improved durability and flexibility.

Technical Solution

Hereinafter, a moisture and oxygen barrier laminate according to one embodiment of the present invention will be described.

Unless defined otherwise, all technical and scientific terms used herein have the same meaning as commonly understood by one of ordinary skill in the art to which this invention belongs. The terms used herein are for the purpose of describing specific embodiments only and is not intended to limit the scope of the invention.

The singular forms "a," "an" and "the" used herein are intended to include plural forms, unless the context clearly indicates otherwise.

It should be understood that the terms "comprise," "include", "have", etc. are used herein to specify the presence of stated feature, region, integer, step, action, element and/or component, but do not preclude the presence or addition of one or more other feature, region, integer, step, action, element, component and/or group.

While the present invention can be modified in various ways and take on various alternative forms, specific embodiments thereof are illustrated and described in detail below. However, it should be understood that there is no intent to limit the present invention to the particular forms disclosed, but on the contrary, the present invention covers all modifications, equivalents, and alternatives falling within the spirit and scope of the present invention.

In describing a position relationship, for example, when the position relationship is described as 'upon~', 'above~', 'below~', and 'next to~', one or more portions may be arranged between two other portions unless 'just' or 'direct' is used.

In describing a time relationship, for example, when the temporal order is described as 'after~', 'subsequent~', 'next~', and 'before~', a case which is not continuous may be included unless 'just' or 'direct' is used.

The term "at least one" should be understood as including any and all combinations of one or more of the associated listed items.

According to one embodiment of the present invention, there is provided a laminate, comprising:

an inorganic barrier layer and a protective layer sequentially formed on one surface of a transparent substrate, wherein the protective layer comprises an organic copolymer containing a repeating unit derived from a siloxane compound.

The present inventors have conducted intensive research, and as a result, found that when a protective layer including an organic copolymer containing a repeating unit derived from a siloxane compound is formed on an inorganic barrier layer, it is possible to provide a moisture and oxygen barrier laminate with improved durability and flexibility.

The organic copolymer including the repeating unit derived from the siloxane compound not only enables improvement of barrier properties and flexibility of the laminate, but also improves the interlayer adhesion of the laminate to thereby improve durability.

That is, the organic copolymer including the repeating unit derived from the siloxane compound can simultaneously improve the durability and flexibility of the laminate, which are known to have a trade-off relation.

According to one embodiment of the invention, the laminate may have a structure including an inorganic barrier layer and a protective layer sequentially formed on one surface of the transparent substrate.

According to another embodiment of the invention, the laminate may have a structure including an inorganic barrier layer and a protective layer respectively sequentially formed on both surfaces of the transparent substrate.

In the present invention, the transparent substrate may be a plastic film having transparency and flexibility.

Specifically, the transparent substrate may be a plastic film including at least one polymer selected from the group consisting of polyethylene terephthalate (PET), polyethylene naphthalate (PEN), polybutylene terephthalate (PBT), cycloolefin polymer (COP), cycloolefin copolymer (COC), polycarbonate (PC), and poly(methyl methacrylate) (PMMA). Among them, the polyethylene terephthalate film is excellent in strength while having both transparency and flexibility, and thus can be suitably applied as the transparent substrate.

According to one embodiment of the invention, the transparent substrate may have a thickness of 5 μm to 300 μm.

The transparent substrate may preferably have a thickness of 5 μm or more in order to exhibit appropriate strength as a substrate. However, if the substrate is too thick, the flexibility may be decreased. Therefore, the thickness of the transparent substrate is preferably 300 μm or less.

More preferably, the thickness of the transparent substrate may be 5 μm to 250 μm, or 10 μm to 250 μm, or 10 μm to 200 μm, or 10 μm to 150 μm, or 10 μm to 100 μm.

If necessary, the transparent substrate may be surface-treated in order to improve its surface wettability or adhesion to the inorganic barrier layer. As a non-limiting example, the surface treatment may be plasma treatment, corona treatment, glow discharge treatment, or the like.

Meanwhile, the inorganic barrier layer is a thin film made of an inorganic material, and is laminated on one surface of the transparent substrate.

The inorganic barrier layer may be transparent, and may allow the laminate to exhibit moisture and oxygen barrier properties.

Such an inorganic barrier layer may be made of one or more inorganic materials selected from the group consisting of silicon oxide, silicon oxynitride, silicon nitride, aluminum oxide, and aluminum nitride.

According to one embodiment of the invention, the inorganic barrier layer may have a thickness of 1 nm to 200 nm.

The inorganic barrier layer preferably has a thickness of 1 nm or more in order to exhibit appropriate physical properties as a barrier layer. However, when the inorganic barrier layer is too thick, curl may occur due to stress or even slight bending may cause cracks. Therefore, the thickness of the inorganic barrier layer is preferably 200 nm or less.

More preferably, the thickness of the inorganic barrier layer may be 1 nm to 150 nm, or 5 nm to 150 nm, or 5 nm to 100 nm, or 10 nm or 100 nm.

According to one embodiment of the invention, the inorganic barrier layer may be formed on the transparent substrate by a conventional method in the technical field to which the present invention pertains.

For example, as a method of laminating the inorganic barrier layer, an appropriate method can be selected from physical vapor deposition (PVD) or chemical vapor deposition (CVD).

Preferably, as a method of laminating the inorganic barrier layer, an evaporation method such as thermal evaporation and electron-beam evaporation; or sputtering may be selected.

As an example, the evaporation method is the most basic method of forming a thin film, and is a method of forming a thin film by heating and evaporating metallic and non-metallic sources and condensing them on the surface of a substrate having a state where temperature is low. According to one embodiment of the invention, among the evaporation methods, thermal evaporation may be preferably selected as the method of laminating the inorganic barrier layer. The thermal deposition is a deposition method in which a vapor pressure of about $10^{-4}$ torr of an initial vacuum degree is required, electricity is passed through a boat on which a source to be evaporated is placed, and the source is heated using resistance heat generated from the boat. The deposition rate in the thermal deposition may be changed by adjusting the amount of current supplied to the filament. In addition, a reactive gas (oxygen gas) can be added and reacted to form an oxide film ($AlO_x$, $SiO_x$, etc.).

As another example, the sputtering can be preferably used because it has excellent reproducibility and can easily form a dense thin film over a large area. Preferably, reactive sputtering using the inorganic target and reactive oxygen (e.g., oxygen) can be used as a method of laminating the inorganic barrier layer. In the reactive sputtering, the reactive gas is introduced into the system in addition to argon (Ar), which is a plasma generating gas. In the reactive sputtering, devices such as plasma emission monitors, mass flow controllers, etc. are preferably used to precisely control the amount of reactive gas in the system. This is because the stoichiometric ratio of the inorganic thin film to be formed must match. By adjusting the amount of the reaction gas introduced, stable film formation is possible and the inorganic barrier layer having excellent barrier properties can be formed.

Meanwhile, the protective layer is laminated on the inorganic barrier layer.

The protective layer can minimize cracking of the inorganic barrier layer or separation between layers due to deformation such as bending.

In particular, the protective layer includes an organic copolymer including a repeating unit derived from a siloxane compound.

The organic copolymer including the repeating unit derived from the siloxane compound not only enables improvement of barrier properties and flexibility of the laminate, but also improves the interlayer adhesion of the laminate to thereby improve durability.

Preferably, the organic copolymer is a block copolymer including a repeating unit derived from the siloxane compound and a repeating unit containing a urethane group (—NHCOO—). The organic copolymer includes a soft segment, which is a repeating unit containing the urethane group, and a hard segment, which is a repeating unit derived from the siloxane compound. Thereby, the organic copolymer can exhibit excellent barrier properties, durability and heat resistance resulting from the hard segment, and excellent flexibility and interlayer adhesion resulting from the soft segment.

According to one embodiment of the invention, the organic copolymer preferably contains 1 to 40% by weight of the repeating unit derived from the siloxane compound and 60 to 99% by weight of the repeating unit containing the urethane group.

In order to exhibit excellent barrier properties, durability and heat resistance resulting from the hard segment, the organic copolymer preferably contains 1% by weight or more of the repeating unit derived from the siloxane compound. However, when the content of the repeating unit derived from the siloxane compound is too high, the flexibility of the protective layer may be deteriorated. Therefore, the repeating unit derived from the siloxane compound in the organic copolymer is contained in an amount of 40% by weight or less.

More preferably, the organic copolymer may contain, 1 to 40% by weight of the repeating unit derived from the siloxane compound and 60 to 99% by weight of the repeating units containing the urethane group; or 1 to 30% by weight of the repeating unit derived from the siloxane compound and 70 to 99% by weight of the repeating unit containing the urethane group; or 1 to 20% by weight of the repeating unit derived from the siloxane compound and 80 to 99% by weight of the repeating unit containing the urethane group; or 1 to 15% by weight of the repeating unit derived from the siloxane compound and 85 to 99% by weight of the repeating unit containing the urethane group; or 5 to 15% by weight of the repeating unit derived from the siloxane compound and 85 to 95% by weight of the repeating unit containing the urethane group; or 10 to 15% by weight of the repeating unit derived from the siloxane compound and 85 to 90% by weight of the repeating unit containing the urethane group.

According to one embodiment of the invention, the siloxane compound may be polysiloxane terminated with a carbinol group at both ends. That is, in order to facilitate introduction of the repeating unit derived from the siloxane compound into the organic copolymer, the siloxane compound is preferably a polysiloxane which is terminated by a carbinol group at both ends.

More preferably, the siloxane compound may be a polysiloxane represented by the following Chemical Formula 1:

[Chemical Formula 1]

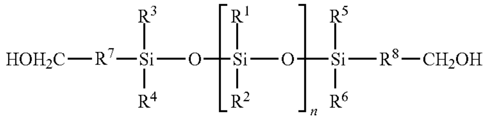

wherein, in Chemical Formula 1, $R^1$ to $R^6$ are each independently a monovalent $C_{1-10}$ hydrocarbon radical, and $R^7$ and $R^8$ are each independently a divalent $C_{1-10}$ hydrocarbon radical.

In one example, in Chemical Formula 1, the $R^1$ to $R^6$ may be each independently a methyl group, an ethyl group, a propyl group, or a phenyl group; and the $R^7$ and $R^8$ may be each independently a methylene group, an ethylene group, a propylene group, or a phenylene group.

Specifically, the siloxane compound may be polydimethylsiloxane, polydiethylsiloxane, polydipropylsiloxane, or polydiphenylsiloxane, which is terminated by a carbinol group at both ends.

According to one embodiment of the invention, the repeating unit containing the urethane group included in the organic copolymer may be represented by the following Chemical Formula 2:

[Chemical Formula 2]

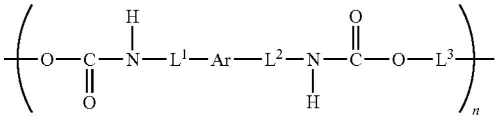

wherein, in Chemical Formula 2,

Ar is a $C_{6-30}$ arylene group which is unsubstituted or substituted by a $C_{1-3}$ alkyl group, $L^1$ and $L^2$ are each independently a direct bond or a $C_{1-5}$ alkylene group, and $L^3$ is a $C_{1-5}$ alkylene group.

In one example, in Chemical Formula 2, the Ar may be a phenylene group, or a phenylene group substituted with a methyl group; the $L^1$ and $L^2$ may each independently be a direct bond, a methylene group or an ethylene group; and the $L^3$ may be a methylene group, an ethylene group, a propylene group, or a butylene group.

As a non-limiting example, the repeating unit containing the urethane group may be represented by the following Chemical Formula 3.

[Chemical Formula 3]

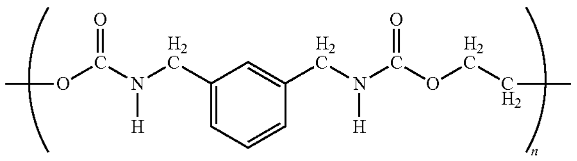

According to one embodiment of the invention, the organic copolymer can be obtained by subjecting the siloxane compound and a polyurethane having the repeating unit containing the urethane group to a condensation polymerization reaction.

At this time, the siloxane compound may have a weight average molecular weight (Mw) of 1500 to 2500 g/mol, or 1600 to 2500 g/mol, or 1600 to 2300 g/mol, or 1700 to 2300 g/mol, or 1700 to 2000 g/mol.

And, the polyurethane may have a weight average molecular weight (Mw) of 10000 to 30000 g/mol, or 12000 to 30000 g/mol, or 12000 to 28000 g/mol, or 15000 to 28000 g/mol, or 15000 to 25000 g/mol.

In the present invention, the weight average molecular weight (Mw) can be measured using a gel permeation chromatography (GPC) under the following conditions after completely dissolving the compound to be measured in a solvent.

Analysis device: PL-GPC 220 system

Column: 2×PLGEL MIXED-B (7.5×300 mm)

Solvent: trichlorobenzene (TCB)+0.04 wt. % dibutylhydroxytoluene (BHT) (after drying with 0.1% CaC12)

Injector, detection temperature: 160 °C.

Flow rate: 1.0 ml/min

Injection volume: 200 µl

Standard sample: polystyrene

According to another embodiment of the invention, the organic copolymer may also be obtained through a step of reacting a siloxane compound with an excessive amount of a diisocyanate compound to prepare a polysiloxane terminated by an isocyanate group; and a step of reacting the polysiloxane terminated by the isocyanate group with a diol compound to give the organic copolymer.

The protective layer may be formed on the inorganic barrier layer by a conventional method in the technical field to which the present invention pertains.

As an example, a wet coating method may be selected as a method of laminating the protective layer. Specifically, as the wet coating method, a bar coating method, a spin coating method, a roller coating method, a spray coating method, an air knife coating method, a flow coating method, a curtain coating method, a direct gravure method, a slit reverse method, etc. may be applied.

As another example, the protective layer may be laminated on the inorganic barrier layer using an adhesive or an adhesive film.

According to one embodiment of the invention, the protective layer may include a mixture of the organic copolymer and a silane-based coupling agent. That is, the protective layer may further include a silane-based coupling agent capable of improving adhesion to the inorganic barrier layer.

According to one embodiment of the invention, the protective layer may have a thickness of 1 nm to 1000 nm.

In order to exhibit appropriate physical properties as a protective layer, the thickness of the protective layer is preferably 1 nm or more. However, when the protective layer is too thick, the flexibility may decrease and curl may occur due to stress. Therefore, the thickness of the protective layer is preferably 1000 nm or less.

More preferably, the thickness of the protective layer may be 5 nm to 1000 nm, or 5 nm to 800 nm, or 10 nm to 800 nm, or 50 nm to 700 nm, or 100 nm to 700 nm, or 200 nm to 600 nm.

According to one embodiment of the invention, the laminate may be used as a food packaging material. According to another embodiment of the invention, the laminate can be applied to various electronic elements such as liquid crystal display elements, solar electronics, touch panels, organic EL elements, organic TFTs, organic semiconductor sensors, organic light emitting devices, film capacitors, inorganic EL elements, and color filters, or can be used as a packaging material for the electronic devices.

As the laminate according to the present invention includes the above-mentioned layer structure and components, excellent interlayer adhesion can be maintained even when deformation such as bending is applied, and thus excellent moisture and oxygen barrier properties can be exhibited.

One of the key properties of flexible barrier materials is a flexural durability or a resistance to repeated deformation, also called Gelboflex. These properties can be evaluated by the Gelbo flex test.

The test can be performed according to ASTM F392 (Standard Practice for Conditioning Flexible Barrier Materials for Flex Durability) using a Gelbo flex tester.

For example, in the test, the laminate sample is attached to the mandrel of a Gelbo flex tester. The bending motion consists of a horizontal motion (compression) and a twisting motion combined with it, and the laminate is repeatedly twisted and bent. The rate of bending is 45 to 60 cycles per minute. After a predetermined number of strokes, the laminate sample is inspected. In the inspection, the amount of change in moisture barrier properties, oxygen barrier properties, and peel test results of the laminate sample before and after the Gelbo flex test are confirmed.

Advantageous Effects

The moisture and oxygen barrier laminate according to the present invention has improved durability and flexibility. The laminate according to the present invention can maintain excellent interlayer adhesion even when deformation such as bending is applied, thereby exhibiting excellent moisture and oxygen barrier properties.

DETAILED DESCRIPTION OF THE EMBODIMENTS

Preferred embodiments are presented below to facilitate understanding of the invention. However, the following examples are for illustrative purposes only, and the present invention is not limited thereto.

Preparation Example 1 (Preparation of Organic Copolymer)

Polydimethylsiloxane terminated by a carbinol group at both ends (weight average molecular weight: 1810 g/mol, manufacturer: Shin-Etsu Chemical) was prepared. Polyurethane having a repeating unit represented by the following Chemical Formula 3 (weight average molecular weight: 20000 g/mol, manufacturer: Mitsui Chemical) was prepared.

[Chemical Formula 3]

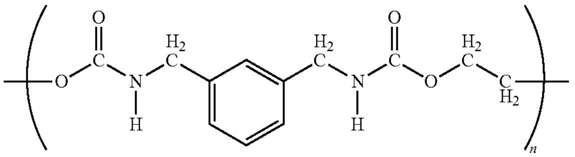

1.5 g (15 wt. %) of the polydimethylsiloxane (solid content: 100 wt. %) and 25.75 g (85 wt. %) of the polyurethane (solid content: 33 wt. %) were put in a polymerization reactor and stirred at 100 to 200 rpm, and then 115.6 g of isopropyl alcohol (IPA) solvent was put in the reactor, stirred at 300 to 400 rpm, and subjected to a condensation polymerization reaction at 80 °C for 2 hours.

Through the condensation polymerization reaction, a block copolymer having a repeating unit derived from polydimethylsiloxane and a repeating unit of Chemical Formula 3 (solid content: 7 wt. %) was obtained.

Preparation Example 2 (Preparation of Organic Copolymer)

A block copolymer was obtained in the same manner as in Preparation Example 1, except that 1 g (10 wt. %) of the polydimethylsiloxane and 27.27 g (90 wt. %) of the polyurethane were put in the polymerization reactor and subjected to a condensation polymerization reaction.

Example 1

A PET film having a thickness of 12 m was prepared as a transparent substrate. The PET film was fixed to a plate of thermal evaporation equipment (model name: Daon-100-TE, manufacturer: DAON) with a tape, and an AI chip (purity: 99.999%) was placed on the boat, and a rotary pump and a diffusion pump were operated to create a vacuum ($4.4\times10^5$ torr). Aluminum oxide (AlOx) was deposited to a thickness of 10 nm on the PET film under the conditions of an evaporation rate of 2.0 Å/s, an oxygen flow rate of 23 sccm, a working time of 19.8 s, and an applied current of 175.2 A to form the inorganic barrier layer.

The block copolymer-containing solution obtained in Preparation Example 1 was bar-coated (#6, based on thickness 550 nm) on the inorganic barrier layer and dried with hot air (100 °C, 12 s) to form a protective layer having a thickness of 550 nm.

By the above method, a laminate including an inorganic barrier layer and a protective layer sequentially formed on a transparent substrate was obtained.

Example 2

A laminate was obtained in the same manner as in Example 1, except that 1 wt. % of a silane coupling agent (product name: KBM403, manufacturer: Shin-Etsu Chemical) based on the total weight of the solution was further added to the block copolymer-containing solution,

Example 3

A laminate was obtained in the same manner as in Example 1, except that the block copolymer obtained in Preparation Example 2 was used instead of Preparation Example 1.

Comparative Example 1

A laminate was obtained in the same manner as in Example 1, except that the protective layer was not formed on the inorganic barrier layer.

Comparative Example 2

A laminate was obtained in the same manner as in Example 1, except that instead of the block copolymer-containing solution, the polydimethylsiloxane (weight average molecular weight: 1810 g/mol, manufacturer: Shin-Etsu Chemical) terminated by carbinol groups at both ends was bar-coated onto the inorganic barrier layer to form the protective layer.

Comparative Example 3

A laminate was obtained in the same manner as in Example 1, except that instead of the block copolymer-containing solution, the polyurethane having a repeating unit of Chemical Formula 3 (weight average molecular weight: 20000 g/mol, manufacturer: Mitsui Chemical) was bar-coated onto the inorganic barrier layer to form the protective layer.

Comparative Example 4

A PET film having a thickness of 12 m was prepared as a transparent substrate. The PET film was fixed to a plate of thermal evaporation equipment (model name: Daon-100-TE, manufacturer: DAON) with a tape, and an AI chip (purity: 99.999%) was placed on the boat, and a rotary pump and a diffusion pump were operated to create a vacuum ($4.4\times10^{-5}$ torr). Aluminum oxide (AlOx) was deposited to a thickness of 10 nm on the PET film under the conditions of an evaporation rate of 2.0 Å/s, an oxygen flow rate of 23 sccm, a working time of 19.8 s, and an applied current of 175.2 A to form the inorganic barrier layer.

Then, silicon oxide (SiOx) was deposited to a thickness of 100 nm on the inorganic barrier layer using the thermal evaporation device identical to the above to form an inorganic protective layer. Specifically, the PET film on which the inorganic barrier layer was formed was fixed to the plate of the thermal evaporation device with a tape, and a SiO chip (silicon monoxide, purity 99.999%) was placed on the boat, a rotary pump, and a diffusion pump were operated to create a vacuum ($4.4\times10^{-5}$ torr). Silicon oxide (SiOx) was deposited to a thickness of 100 nm on the inorganic barrier layer under the conditions of an evaporation rate of 140.0 Å/s, an oxygen flow rate of 10 sccm, a working time of 19.8 s, and an applied current of 140 A to form the inorganic protective layer.

By the above method, a laminate including an inorganic barrier layer and a protective layer sequentially formed on a transparent substrate was obtained.

Test Example (1) Evaluation of Moisture Barrier Property

The laminate samples with a size of 50 $cm^2$ were mounted in a water vapor permeation analyzer (model name: AQUATRAN 2 WVTR Analyzer, manufacturer: Mocon Inc.), and then the water vapor transmission rate ($g/m^2$*day) was measured under conditions of 40 °C and 90% relative humidity according to the standard test method of ASTM F1249.

(2) Evaluation of Oxygen Barrier Property

The laminate samples with a size of 50 $cm^2$ were mounted in an oxygen permeation analyzer (model name: OX-Tran 2/21 OTR Analyzer, manufacturer: Mocon Inc.), and then the oxygen transmission rate ($cc/m^2$*day) was measured under conditions of 23 °C and 0% relative humidity according to the standard test method of ASTM D3985.

(3) Peel Test 15.3 g of a main agent component (product name: TM-585-60K, solid content: 60 wt. %), which is a polyester-based two-component adhesive, 1.9 g of a curing agent component (product name: CAT-10, solid content: 75 wt. %), and 25.2 g of a solvent (ethyl acetate) were mixed to prepare an adhesive composition. The adhesive composition was bar-coated (#12, based on thickness of 5 μm) on the protective layer of the laminate, and then dried with hot air (100 °C, 20 s) to form an adhesive layer having a thickness of 5 μm. A CPP film was laminated on the adhesive layer and aged at 45 °C for 1 day to prepare a test sample.

Two sheets of double-sided tapes were attached onto the measuring plate of a peel tester (model name: AR-1000, manufacturer: ChemInstruments), to which the test sample cut to 2.5 cm in width was attached, and a 180° peel test was performed according to the standard test method of ASTM D3330 to obtain a peel strength value (gf/mm).

(4) Gelbo Flex Test

The laminates obtained in Examples and Comparative Examples were subjected to a Gelbo flex test.

The test was performed according to the standard test method of ASTM F392 using a Gelbo flex tester (model name: G0005, manufacturer: IDM Instruments). Specifically, a nylon fiber and a cast polypropylene (CPP) film were sequentially laminated using an adhesive on the other surface of the transparent substrate on which the inorganic barrier layer and the protective layer were not formed in the laminate to prepare a test sample. The test sample was attached to the mandrel of the Gelbo flex tester. The test setup gave a twisting motion of 440° in the first 90 mm of the stroke, and was followed by a straight horizontal motion of 65 mm. At this time, the speed of the bending motion was set to 50 cycles per minute.

After 50 cycles of stroke, the laminate was recovered from the test sample, and the (1) moisture barrier property evaluation, (2) oxygen barrier property evaluation and (3) peel test were conducted again.

TABLE 1

| | | Example 1 | Example 2 | Example 3 |
|---|---|---|---|---|
| Initial | Moisture barrier ($g/m^2$*day) | 0.50 | 0.55 | 0.83 |
| | Oxygen barrier ($cc/m^2$*day) | 0.30 | 0.27 | 0.55 |
| | Peel strength (gf/cm) | 100 | 150 | 130 |
| After Gelbo flex test | Moisture barrier ($g/m^2$*day) | 0.77 | 0.65 | 1.03 |
| | Oxygen barrier ($cc/m^2$*day) | 0.75 | 0.50 | 0.95 |
| | Peel strength (gf/cm) | 95 | 150 | 110 |

TABLE 2

| | | Comparative Example 1 | Comparative Example 2 | Comparative Example 3 | Comparative Example 4 |
|---|---|---|---|---|---|
| Initial | Moisture barrier ($g/m^2$*day) | 3.96 | 0.40 | 0.85 | 0.07 |
| | Oxygen barrier ($cc/m^2$*day) | 4.10 | 0.30 | 0.58 | 0.06 |
| | Peel strength | 137 | 100 | 105 | 103 |

TABLE 2-continued

| | | Comparative Example 1 | Comparative Example 2 | Comparative Example 3 | Comparative Example 4 |
|---|---|---|---|---|---|
| | (gf/cm) | | | | |
| After Gelbo flex test | Moisture barrier ($g/m^2$*day) | 52.97 | 1.59 | 1.78 | 1.13 |
| | Oxygen barrier ($cc/m^2$*day) | 68.43 | 1.85 | 1.95 | 1.77 |
| | Peel strength (gf/cm) | 75 | 50 | 84 | 56 |

Referring to Table 1, the laminates according to Examples were excellent in initial moisture and oxygen barrier properties, and especially exhibited excellent moisture and oxygen barrier properties and release properties even after the Gelbo Flex test. And, when an organic copolymer having a relatively high content of repeating units containing a urethane group was applied to the protective layer, it can be seen that the moisture and oxygen barrier properties were slightly lowered, but excellent peel strength was exhibited.

In contrast, referring to Table 2, the laminate of Comparative Example 1 was inferior in initial moisture and oxygen barrier properties to those of Examples, and the laminates of Comparative Examples 1 to 3 had significantly deteriorated properties after the Gelbo plex test. The laminate of Comparative Example 4 exhibited the most excellent initial moisture and oxygen barrier properties, but its properties were rapidly deteriorated after the Gelbo flex test.

The invention claimed is:

1. A laminate, comprising:

an inorganic barrier layer and a protective layer sequentially formed on one surface of a transparent substrate, wherein the protective layer comprises an organic copolymer containing a repeating unit derived from a siloxane compound and a repeating unit containing a urethane group (—NHCOO—), wherein the organic copolymer is a block copolymer obtained by subjecting the siloxane compound having a weight average molecular weight of 1,500 to 2,500 g/mol and a polyurethane having the repeating unit containing the urethane group and a weight average molecular weight of 10,000 to 30,000 g/mol to a condensation polymerization reaction.

2. The laminate according to claim 1, wherein the organic copolymer contains 1 to 40% by weight of the repeating unit derived from the siloxane compound and 60 to 99% by weight of the repeating unit containing the urethane group.

3. The laminate according to claim 1, wherein the siloxane compound is a polysiloxane which is terminated with a carbinol group at both ends.

4. The laminate according to claim 3, wherein the siloxane compound is a polysiloxane represented by the following Chemical Formula 1:

[Chemical Formula 1]

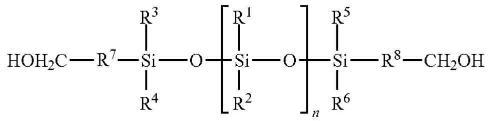

wherein, in Chemical Formula 1, $R^1$ to $R^6$ are each independently a monovalent $C_{1-10}$ hydrocarbon radical, and $R^7$ and $R^8$ are each independently a divalent $C_{1-10}$ hydrocarbon radical.

5. The laminate according to claim 4, wherein:

$R^1$ to $R^6$ are each independently a methyl group, an ethyl group, a propyl group, or a phenyl group, and $R^7$ and $R^8$ are each independently a methylene group, an ethylene group, a propylene group, or a phenylene group.

6. The laminate according to claim 1, wherein the the repeating containing the urethane group is represented by the following Chemical Formula 2:

[Chemical Formula 2]

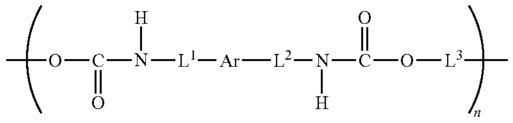

wherein, in Chemical Formula 2,

Ar is a $C_{6-30}$ arylene group which is unsubstituted or substituted by a $C_{1-3}$ alkyl group, $L^1$ and $L^2$ are each independently a direct bond or a $C_{1-5}$ alkylene group, and $L^3$ is a $C_{1-5}$ alkylene group.

7. The laminate according to claim 1, wherein the protective layer comprises a mixture of the organic copolymer and a silane-based coupling agent.

8. The laminate according to claim 1, wherein the transparent substrate comprises one or more polymers selected from the group consisting of polyethylene terephthalate, polyethylene naphthalate, polybutylene terephthalate, cycloolefin polymer, cycloolefin copolymer, polycarbonate, and poly(methyl methacrylate).

9. The laminate according to claim 1, wherein the inorganic barrier layer is made of one or more inorganic materials selected from the group consisting of silicon oxide, silicon oxynitride, silicon nitride, aluminum oxide, and aluminum nitride.

10. The laminate according to claim 1, wherein the transparent substrate has a thickness of 5 μm to 300 μm.

11. The laminate according to claim 1, wherein the inorganic barrier layer has a thickness of 1 nm to 200 nm.

12. The laminate according to claim 1, wherein the inorganic barrier layer has a thickness of 1 nm to 1000 nm.

* * * * *